United States Patent
Eriksson et al.

(10) Patent No.: US 10,906,487 B2
(45) Date of Patent: Feb. 2, 2021

(54) MODULE FOR A CRASH MANAGEMENT SYSTEM

(71) Applicant: Ningbo Geely Automobile Research & Development Co., Ltd., Ningbo (CN)

(72) Inventors: Emil Eriksson, Stenkullen (SE); Oskar Ewehag, Gothenburg (SE)

(73) Assignee: CHINA-EURO VEHICLE TECHNOLOGY AB, Göteborg (SE)

(*) Notice: Subject to any disclaimer, the term of this patent is extended or adjusted under 35 U.S.C. 154(b) by 154 days.

(21) Appl. No.: 16/356,863

(22) Filed: Mar. 18, 2019

(65) Prior Publication Data
US 2019/0232906 A1    Aug. 1, 2019

Related U.S. Application Data

(63) Continuation of application No. PCT/CN2017/102713, filed on Sep. 21, 2017.

(30) Foreign Application Priority Data

Sep. 30, 2016  (EP) ..................... 16191880

(51) Int. Cl.
*B60R 19/34* (2006.01)
*B60R 19/22* (2006.01)
(Continued)

(52) U.S. Cl.
CPC ............ *B60R 19/34* (2013.01); *B60R 19/023* (2013.01); *B60R 19/03* (2013.01); *B60R 19/22* (2013.01);
(Continued)

(58) Field of Classification Search
CPC ....... B60R 19/03; B60R 19/023; B60R 19/34; B60R 19/22; B60R 19/24; B60R 2019/247
(Continued)

(56) References Cited

U.S. PATENT DOCUMENTS

| 6,398,275 B1* | 6/2002 | Hartel | B60R 19/18 293/102 |
| 8,469,417 B2* | 6/2013 | Di Modugno | B60R 19/34 293/133 |

(Continued)

FOREIGN PATENT DOCUMENTS

| CN | 201040514 | 3/2008 |
| CN | 201296222 | 8/2009 |

(Continued)

OTHER PUBLICATIONS

International Search Report and Written Opinion from corresponding International Patent Application No. PCT/CN2017/102713, dated Dec. 21, 2017, 7 pages.
(Continued)

*Primary Examiner* — Joseph D. Pape
*Assistant Examiner* — Dana D Ivey
(74) *Attorney, Agent, or Firm* — Tucker Ellis LLP (57) ABSTRACT

An interface module for a vehicle crash management system wherein the interface module includes a support structure and a covering layer, and the interface module is adapted for attaching a crash box to a bumper beam. A first section of the support structure is adapted for being placed in direct contact with the bumper beam. A second section of the support structure comprises a recess adapted for receiving one end of the crash box, and the second section is further adapted for being covered by the covering layer. The covering layer is adapted for being arranged on the second surface, such that the support structure is completely enclosed between the bumper beam and the covering layer. Also disclosed are a crash management system and a method for assembling such a system.

18 Claims, 4 Drawing Sheets

(51) Int. Cl.
*B60R 19/03* (2006.01)
*B60R 19/24* (2006.01)
*B60R 19/02* (2006.01)

(52) U.S. Cl.
CPC ........ *B60R 19/24* (2013.01); *B60R 2019/247* (2013.01)

(58) Field of Classification Search
USPC .......................................................... 293/133
See application file for complete search history.

(56) References Cited

U.S. PATENT DOCUMENTS

2002/0047281 A1    4/2002  Hartel
2015/0001866 A1*   1/2015  Noyori .................... B60R 19/34
                                                    293/133

FOREIGN PATENT DOCUMENTS

| CN | 203681453 | 7/2014 |
| CN | 203996061 | 12/2014 |
| EP | 2404788 B1 | 9/2016 |
| KR | 20140042969 | 4/2014 |

OTHER PUBLICATIONS

Extended European Search Report from corresponding European Patent Application No. 16191880.0, dated Feb. 23, 2017, 6 pages.

* cited by examiner

MODULE FOR A CRASH MANAGEMENT SYSTEM

RELATED APPLICATION DATA

This application is a continuation of International Patent Application No. PCT/CN2017/102713 filed Sep. 21, 2017, which claims the benefit of European Patent Application No. 16191880.0 filed Sep. 30, 2016, the disclosures of which are incorporated herein by reference in their entireties.

FIELD OF THE INVENTION

The present invention relates to a to an interface module for a vehicle crash management system, the interface module being adapted for attaching a crash box to a bumper beam. The present invention further relates to a crash management system and a method for assembling such a system.

BACKGROUND OF THE INVENTION

The Body in White (BIW) is referred to as the assembly of frames and panels made up of homogeneous materials working as main structure of a vehicle. The BIW is important both from safety and environmental perspectives. All structural components have stiffness and strength requirements but only some of them also have energy absorbing requirements—the Crash Management System (CMS) is one of those. The CMS is part of the crash zone where impact energy is to be absorbed during crash. The CMS usually consists of at least three main types of components: a bumper beam, two crash boxes, and connection plates against the body structure.

The automotive industry is continuously searching for means and materials to reduce weight. In relation to the CMS there is also the aspect of safety to take into consideration. The vehicle bumper beam should be attached to the vehicle body via energy absorbing structures, i.e. crash boxes, that are as lightweight as possible but still stable enough to provide a reliable connection between bumper and vehicle body. Further, the crash boxes have to be securely attached to the bumper beam such that the bumper beam does not release from the crash boxes, during regular vehicle use or after minor impact at low speed.

There has been an increase of about 100 kg per decade of the total vehicle weight due to higher safety and comfort standards. The BIW and continuous load bearing elements thus present an attractive target for weight reduction. Composites have some great advantages over traditional metals, their strength-to-weight ratio is excellent, and their energy absorption capability is even better. However, in prior art solutions the bumper beam and crash box are integrated by mechanical fastening methods, such as welding, bolting etc., with metallic material for example known from US2002/0047281 A1 For a composite bumper system, the application of mechanical fastening schemes will trigger an early detachment between the bumper beam and crash box due to the brittle failure modes of composite material. Mechanical joints have the disadvantage of creating stress concentrations. Welding, commonly used for metallic parts, has limited application with composites.

SUMMARY OF THE INVENTION

On this background, it is an object of the present invention to provide an interface module which is lightweight, stable, and cost-effective. This and other objects are achieved by providing an interface module for a vehicle crash management system wherein the interface module comprises a support structure and a covering layer, and the interface module is adapted for attaching a crash box to a bumper beam, a first section of the support structure is adapted for being placed in direct contact with the bumper beam, a second section of the support structure comprises a recess adapted for receiving one end of the crash box, and the second section is further adapted for being covered by the covering layer, the covering layer is adapted for being arranged on the second section, such that the support structure is completely enclosed between the bumper beam and the covering layer. The invention provides a simple, inexpensive module having reduced weight compared to existing solutions, while still having sufficient strength and stiffness.

According to aspects of the invention, the support structure is a foam core. Solid foam materials are well-known, lightweight, and stable.

According to further aspects of the invention the covering layer is a carbon fibre sheet. Carbon fibre is not only a lightweight material but it also has good energy absorbing capabilities.

According to still further aspects of the invention the covering layer is adapted for extending at least partially from the second section onto the bumper beam. Such a solution encloses the foam core securely between bumper beam and covering layer, such that the foam core may provide stable support for the crash boxes without using mechanical fasteners.

According to aspects of the invention, the recess has a cross section which corresponds to a cross section of the end of said crash box. Such a form fitting solution allows each crash box to be securely inserted into an interface module.

According to aspects of the invention, the recess and the crash box are cylindrical. A cylindrical shape is a common shape, allowing the interface module to be used with generic crash boxes.

According to further aspects of the invention a disc is arranged within the recess, the disc having a surface area corresponding to at least a surface area of the end of the crash box. Such a disc is used to strengthen the bottom surface of the interface module such that, e.g. during crash, the crash box does not cut through the interface module instead of just crumbling.

In a further aspect the invention relates to a crash management system comprising a bumper beam, at least two crash boxes, and at least two interface modules comprising a support structure and a covering layer according to the aspects described above.

According to aspects of the invention the crash box and/or bumper beam is made of carbon fibre. Carbon fibre is not only lightweight but also has good energy absorbing capabilities, and is a way of increasing safety further.

According to further aspects of the invention the bumper beam is at least partially provided with a concave cross section and a first section of the support structure is adapted for being placed in direct contact with an inward curving surface of the concave cross section,
such that the support structure is form fitted to the bumper beam.

In a further aspect the invention relates to a method of assembling a crash management system according to any of the aspects described above, wherein the method comprises the steps of: a) manufacturing a bumper beam, b) manufacturing a covering layer, c) combining a support structure, the covering layer, and the bumper beam, and d) molding the support structure, the covering layer, and the bumper beam into one component.

According to aspects of the invention step a) further comprises a1) preforming the bumper beam, and a2) trimming the bumper beam.

According to further aspects of the invention step b) further comprises recycling trim spillage produced in step a2).

According to still further aspects of the invention step c) comprises c1) placing a first section of the support structure in direct contact with the bumper beam, c2) arranging the covering layer on a second section of the support structure, c3) attaching the covering layer to the second section, whereafter the support structure is completely enclosed by the bumper beam and the covering layer.

According to aspects of the invention step c2) further comprises arranging the covering layer such that it extends at least partially onto the bumper beam, and step c3) further comprises attaching the covering layer to the bumper beam.

According to further aspects of the invention steps c) and d) comprises use of resin transfer molding. Resin transfer molding is an established method used in large-scale industrial production.

According to still further aspects of the invention the method further comprises step e): injecting an adhesive into a recess located in the second section. Adhesive bonding provides a more uniform stress distribution than common mechanical fasteners.

According to aspects of the invention the method further comprises step f): inserting one end of a crash box into the recess.

Further objects, features, advantages and properties of the module, system, and method according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE INVENTION

In the following detailed description, the interface module, the crash management system, and the method of assembling such a system according to the present invention will be described by the preferred embodiments.

The construction and operation of a crash management system is as such well-known and should not require further explanation in the present context. Further details regarding the operation of the specific crash management system according to an embodiment of the invention are provided below.

Figure 1:
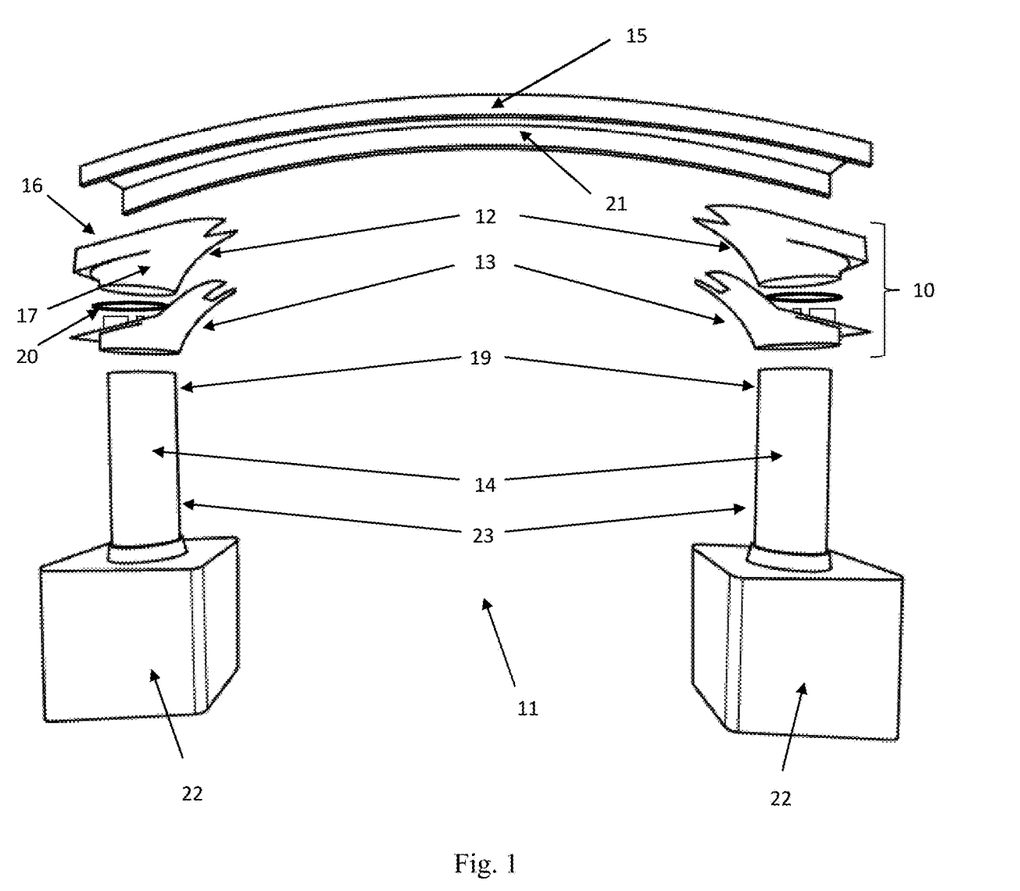
FIG. 1 is an exploded view of a crash box management system according to one embodiment of the present invention.
Figure 2:
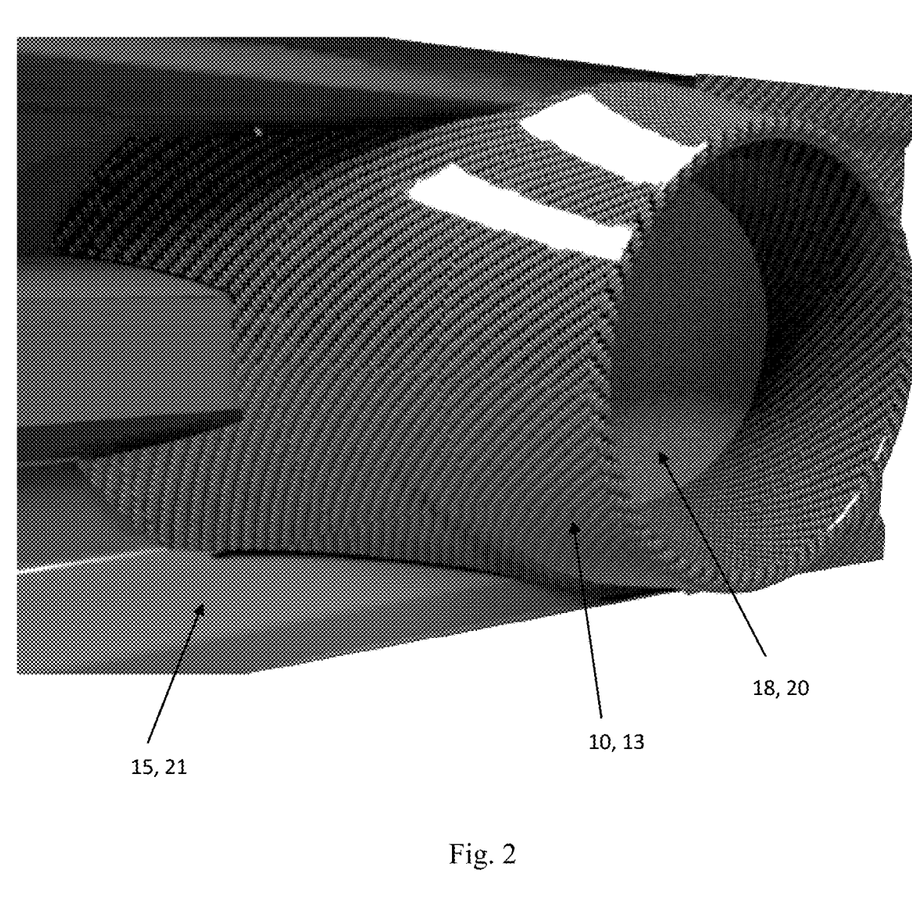
FIG. 2 is a perspective view of a mounted crash management system according to the embodiment of FIG. 1.

FIGS. 1 and 2 show embodiments of the crash management system 11 according to one aspect of the invention, which is particularly suitable for crash boxes 14 comprising composite materials. The crash management system 11 may typically comprise a bumper beam 15 and at least two crash boxes 14, where each crash box 14 may extend between the bumper beam 15 and the vehicle structure 22 such that external forces, which the bumper beam 15 is subjected to, are transferred to the two crash boxes 14 via the rim 23 of the crash box 14.

As the crash box is subjected to an external compressing force, such as that arising when a vehicle crashes into a stationary object, the forces are absorbed through the crushing of the composite. Thus, reducing impact forces on, and possibly sparing, a vehicle frame on which the crash management system is arranged when in use.

The bumper beam 15 has an essentially curved shape, with an open, inwardly curved cross section forming at most a 180° circle. In other words, the bumper beam 15 has an, at least partially, concave cross section. Examples of such cross sections are shown in FIGS. 3A-3F. The cross section may be arc shaped, as in FIGS. 3A and 3D, but is preferably spline shaped, as in FIGS. 3B, 3C, 3E, 3F, such that the inner face of the bumper beam is provided with at least one essentially flat surface against which an interface module 10, described in more detail below, may rest such that a more uniform force transfer is achieved during crash.

Figure 3A:
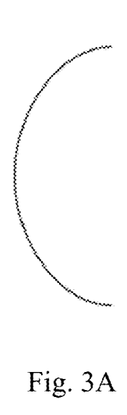
FIGS. 3A-3F are schematic depictions of multiple bumper beam cross sections according to embodiments of the present invention.
Figure 3B:
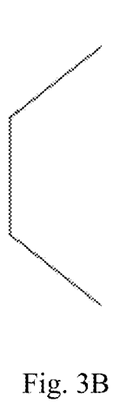
Figure 3C:
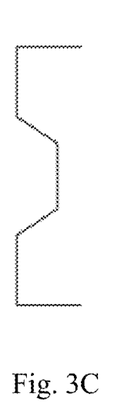
Figure 3D:
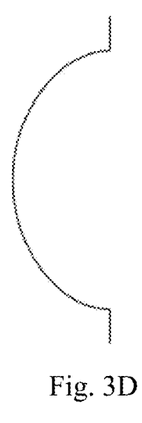
Figure 3E:
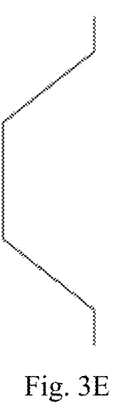
Figure 3F:
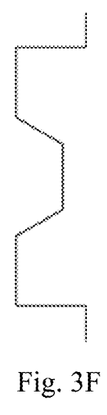

A cross section such as those of FIGS. 3D-3F, wherein the bumper beam is provided with flanges, has a greatly improved capability. The use of a ridges, as shown in FIGS. 3C and 3F, also improves the capability of the bumper beam, and hence the capability of the crash management system. In a preferred embodiment, the bumper beam has a cross section which is provided with flanges and ridge, see FIG. 3F, wherein the ridge covers approximately 80% of the length of the beam.

The bumper beam is preferably made of a standard laminate. The number of layers, and their direction, affect the strength of the component. Generally, a symmetric laminate with layers in 0°, 45°, and 90° directions is preferable, such as $[\pm 45°/90°/0_8°]_s$. The laminate preferably has a high share of 0° layers, best placed in a middle position of the laminate. ±45° layers, preferably placed in outer positions, show superior performance to distribute stress over the component and keep strain low. 90° layers help reduce maximum strain.

At least one interface module 10 may extend between each of the crash boxes 14 and the bumper beam 15. The interface module 10 facilitates the transition and attachment between the crash box 14 and the bumper beam 15. The interface module 10 will be described in more detail below.

As mentioned above, the interface module 10 is adapted for attaching a crash box 14 to a bumper beam 15. Each interface module 10 comprises a support structure 12 and a covering layer 13. The support structure 12 functions as a frame onto which the covering layer 13 is draped, and also as a socket for one end of a crash box 14. In use, the support structure 12 is arranged such that it protrudes from the concave profile of the bumper beam 15, transversally to the length of the bumper beam and in the direction of the crash boxes.

The support structure 12 is preferably a foam core, but could be made of any suitable, stable material such as metal or wood. Solid foams are an important class of lightweight cellular engineering materials. The foam core may comprise of one or several plastic polymers, e.g. elastomers such as polyurea and polyurethane, or thermo-plastics such as PVC and PET. The foam core is preferably stable enough such that it provides transversal support for each crash box 14, e.g., in a direction which is transversal to the direction of the centre axis of the crash box.

The covering layer 13 is preferably a carbon fibre sheet, but could be made of any suitable, composite material such as fiberglass or other types of plastic. Preferably, the carbon fiber sheet is manufactured by spillage from the bumper beam manufacture, which is possible since the covering layer 13 does not have the same capability requirements as the bumper beam 15.

A first section 16 of the support structure 12 is adapted for being placed in direct contact with the bumper beam 15, i.e. shape of the first section must correspond to the shape of the concave cross section of the bumper beam, see FIGS. 1 and 2. As also shown in FIGS. 1 and 2, the support structure may be provided with a cutout which accommodates, e.g., a ridge located on the interior surface of the bumper beam. In other words, the bumper beam 15 is designed first, and thereafter the support structure 12 is designed to, i.e., fit the shape of the optimized bumper beam 15. E.g., the first surface 16 of the support structure 12 may be as wide as the length of the bumper beam.

A second section 17 of the support structure 12 is adapted for being covered by the covering layer 13. The second section comprises the remaining surfaces of the support structure 12, i.e. all surfaces which are not covered by the concave, interior surface of the bumper beam. The second section 17 also comprises a recess 18 adapted for receiving one end 19 of the crash box 14. The second section 17 is preferably adapted such that its inclination is suitable for molding tools and when considering the draping of the covering layer 13, e.g., in order to avoid creases.

E.g., the support structure may be shaped somewhat like a truncated cone, where the first section/surface 16 constitutes what would be the widest base surface of the truncated cone. The oppositely arranged top surface of the truncated cone would comprise the recess 18. The top surface is not parallel to the first section/surface 16 i.e. the plane of the top surface is arranged such that it is extends at an angle in relation to the plane of the first section/surface 16. The surface area of the truncated cone extends between the first section/surface 16 and the top surface/recess 18. The first section/surface 16 preferably has an oblong shape while the top surface has a peripheral shape which corresponds to the shape of the end of a crash box, e.g. circular. When considering the cavity created by recess 18, the shape would be considered to be cylindrical. The second section 17 hence comprises the top surface and recess 18 and the surface area, i.e. all surfaces except the base surface.

The covering layer 13 is adapted for being arranged flush onto the second section 17, also being draped, lined, folded, or stretched into the recess. Further, the covering layer 13 is adapted for covering not only the second section 17 of the support structure 12, but to also extend at least partially, at selected, critical points, onto the bumper beam. This way, the covering layer may bond with both the support structure 12 and the bumper beam 15, enabling a more secure attachment of the support structure 12 to the bumper beam 15. Hence, the support structure 12 is attached to the bumper beam and also completely enclosed between the bumper beam 15 and the covering layer 13.

The recess 18 has a cross section which corresponds to the cross section of one end 19 of the crash box 14, i.e. a female, interior shape which corresponds to the male, exterior shape of the crash box 14. The inner dimensions of the recess are preferably 0.1-2 mm larger than the outer dimensions of the end 19 of the crash box 14. Preferably, both recess 18 and crash box 14 are cylindrical, since cylindrical crash boxes are relatively easy to manufacture, and since they exhibit good shock absorbing qualities. They could however be provided with cross sections that are, e.g., oval, square, or some other polygon. Further, the interior bottom of the recess 18 may be provided with a reinforcement in the shape of a disc made of a hard material such as metal, e.g. steel, or ceramic. The disc 20 preferably has a surface area which corresponds to the surface area of the end 19 of the crash box 14, i.e. a hollow ring. The disc could however also be massive.

Aspects of the invention further include a crash management system comprising a bumper beam 15, at least two crash boxes 14, and at least two interface modules 10.

Each crash box is adapted for being fixed to an interface module, e.g. by means of an adhesive such as glue. Preferably, the crash boxes 14 and/or the bumper beam 15 is made of carbon fibre. Other suitable, lightweight materials, or combinations of materials, may be used.

As previously mentioned, the bumper beam 15 has, at least partially, a concave cross section. I.e., an inwardly curved open section, such as e.g. a U-shape, into which the interface modules 10 and crash boxes 14 are to be placed. The first section 16 of the support structure 12 is adapted for being placed in direct contact with the inwardly curved surface 21 of the bumper beam 15. Hence, the support structure 12 is form fitted to the bumper beam 15.

Figure 4:
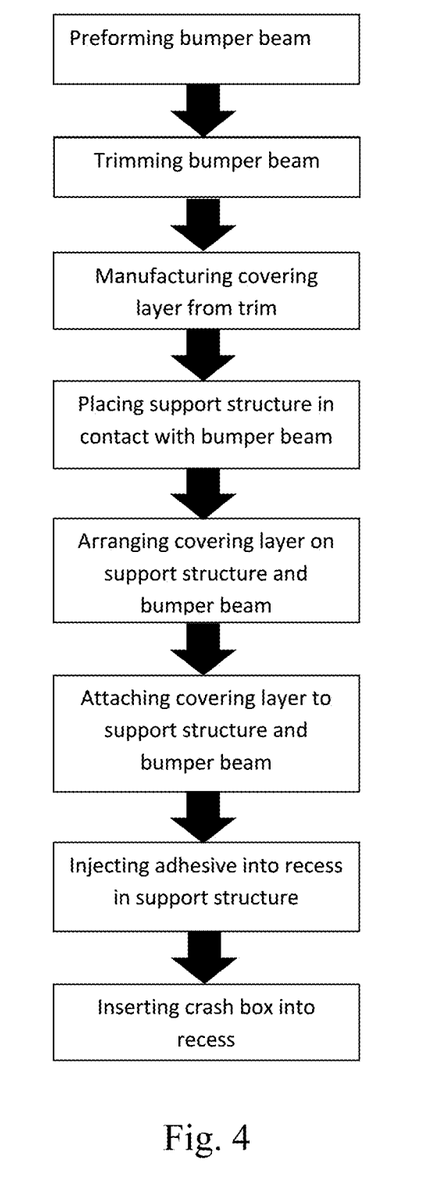
FIG. 4 is a schematic depiction of a method of manufacturing a crash management system according to one embodiment of the present invention.

Aspects of the invention further include a method of manufacturing the crash management system 11, shown in FIG. 4. The method may include but is not limited to comprise the following steps nor in the prescribed order:

Primarily, the bumper beam 15 is preformed and trimmed according to previously discussed requirements, using conventional manufacturing methods. Thereafter, the covering layer/carbon fibre sheet 13 is manufactured, preferably by recycling the spillage from the bumper beam manufacture.

Subsequently, the support structure 12, the covering layer 13, and the bumper beam 15 are combined and molded together. In one preferred embodiment, resin transfer molding is used, but other methods such as e.g. pre-preg with autoclave curing are conceivable. Resin transfer molding is suitable for fabricating three-dimensional structure since tight dimensional requirements can be met. A further advantage is the possibility of to produce large and complex components with relatively low cost. Also, the possibility to integrate mechanical fasteners and sandwich cores into the component is also highly beneficial.

Firstly, when combining the above mentioned components, the first section 16 of the support structure 12 is placed on top of, and in direct contact with, an interior surface of the bumper beam 15. The first section 16 may be placed loosely on the surface of the bumper beam 15, or it may be e.g. glued to the bumper beam. The first section 16 of the support structure 12 may also be self-adhering.

Secondly, the covering layer 13 is arranged on the second section 17 of the support structure 12, directly on top of and across the entire section 17. Further, the covering layer 13 may be arranged such that it extends at least partially onto the interior surface of the bumper beam.

Thereafter, the components are molded into one by attaching the covering layer 13 to the second section 17. Further, and simultaneously, the extending portions of the covering layer 13 are attached to the bumper beam 15. Hence, the support structure 12 will be completely enclosed by the bumper beam 15 and the covering layer 13.

Finally, an adhesive such as glue is injected into the recess 18 located in the second section 17 of each support structure 12, and one end 19 of a crash box 14 is inserted into each recess 18.

The method may be combined with any aspect of the interface module 10 or the crash management system 11 such that, for example, it includes yet another step comprising arranging a metal disc 20 within the recess 18 prior to injecting adhesive.

As mentioned, the crash box 14, and corresponding recess 18, may comprise various shapes comprised by the art and in a non-limiting example the crash box 14 and recess 18 may be shaped as a parallelepiped or a circular or oval cylinder.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality. The single processor or other unit may fulfill the functions of several means recited in the claims.

NOMENCLATURE

10 Interface module
11 Crash management system
12 Support structure/Foam core
13 Covering layer/Carbon fibre sheet
14 Crash box
15 Bumper beam
16 First section of support structure
17 Second section of support structure
18 Recess in support structure
19 End of crash box
20 Disc
21 Interior surface of bumper beam
22 Vehicle structure
23 Crash box external surface/Rim

The invention claimed is:

1. A interface module for a vehicle crash management system,
wherein said interface module comprises a
support structure and a covering layer,
and said interface module is adapted to attach a crash box to a bumper beam,
a first section of said support structure is adapted to be placed in direct contact with said bumper beam,
a second section of said support structure comprises a recess adapted to receive one end of said crash box, and said second section is covered by said covering layer,
said covering layer is arranged on said second section such that,
when in use, said support structure is completely enclosed between said bumper beam and said covering layer.

2. The interface module according to claim 1, wherein said support structure is a foam core.

3. The interface module according to claim 1, wherein said covering layer is a carbon fibre sheet.

4. The interface module according to claim 1, wherein said covering layer is adapted for extending at least partially from said second section onto said bumper beam.

5. The interface module according to claim 1, wherein said recess has a cross section which corresponds to a cross section of said end of said crash box.

6. The interface module according to claim 1, wherein said recess and said crash box are cylindrical.

7. The interface module according to claim 1, wherein a disc is arranged within said recess, said disc having a surface area corresponding to at least a surface area of said end of said crash box.

8. A crash management system comprising a bumper beam, at least two crash boxes, and at least two interface modules comprising a support structure and a covering layer according to claim 1.

9. The crash management system according to claim 8, wherein said crash box and/or bumper beam is made of carbon fibre.

10. The crash management system according to claim 8, wherein said bumper beam is at least partially provided with a concave cross section and wherein a first section of said support structure is adapted for being placed in direct contact with an inward curving surface of said concave cross section,
such that said support structure is form fitted to said bumper beam.

11. A method of assembling a crash management system comprising: a bumper beam, at least two crash boxes, and at least two interface modules comprising a support structure and a covering layer wherein said at least two interface modules are adapted to attach a crash box to a bumper beam, a first section of said support structure is adapted to be placed in direct contact with said bumper beam, a second section of said support structure comprises a recess adapted to receive one end of said crash box, and said second section is covered by said covering layer, said covering layer is arranged on said second section such that; when in use, said support structure is completely enclosed between said bumper beam and said covering layer, said method comprises the steps of: a) manufacturing the bumper beam, b) manufacturing the covering layer, c) combining a said support structure, said covering layer, and said bumper beam, and d) molding said support structure, said covering layer, and said bumper beam into one component.

12. The method of assembling a crash management system according to claim 11, wherein step a) comprises:
a1) preforming said bumper beam, and
a2) trimming said bumper beam.

13. The method of assembling a crash management system according to claim 12, wherein step b) comprises:
recycling trim spillage produced in step a2).

14. The method of assembling a crash management system according to claim 11,
wherein step c) comprises:
c1) placing a first section of said support structure in direct contact with said bumper beam,
c2) arranging said covering layer on a second section of said support structure,
c3) attaching said covering layer to said second section,
whereafter said support structure is completely enclosed by said bumper beam and said covering layer.

15. The method according to claim 14, wherein step c2) further comprises arranging said covering layer such that it extends at least partially onto said bumper beam, and step c3) further comprises attaching said covering layer to said bumper beam.

16. The method according to claim 11, wherein steps c) and d) comprises use of resin transfer molding.

17. The method according to claim 11, further comprising step e):
injecting an adhesive into a recess located in said second section.

18. The method according to claim 11, further comprising step f):
   inserting one end of a crash box into said recess.

* * * * *